J. A. STAPLES.
SPRING SYSTEM FOR BEDS, &c.
APPLICATION FILED JULY 25, 1904.
944,518.
Patented Dec. 28, 1909.
2 SHEETS—SHEET 1.
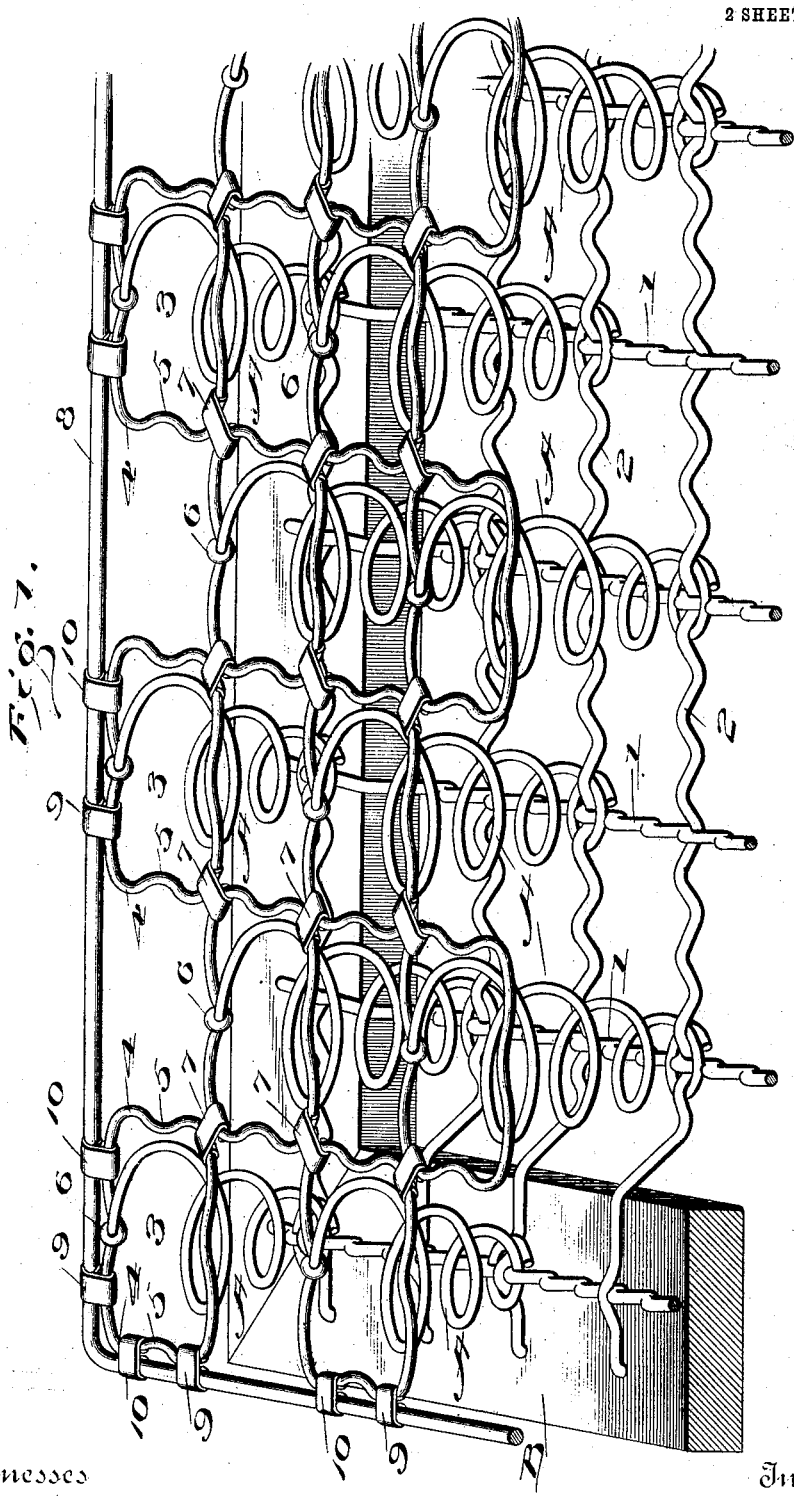

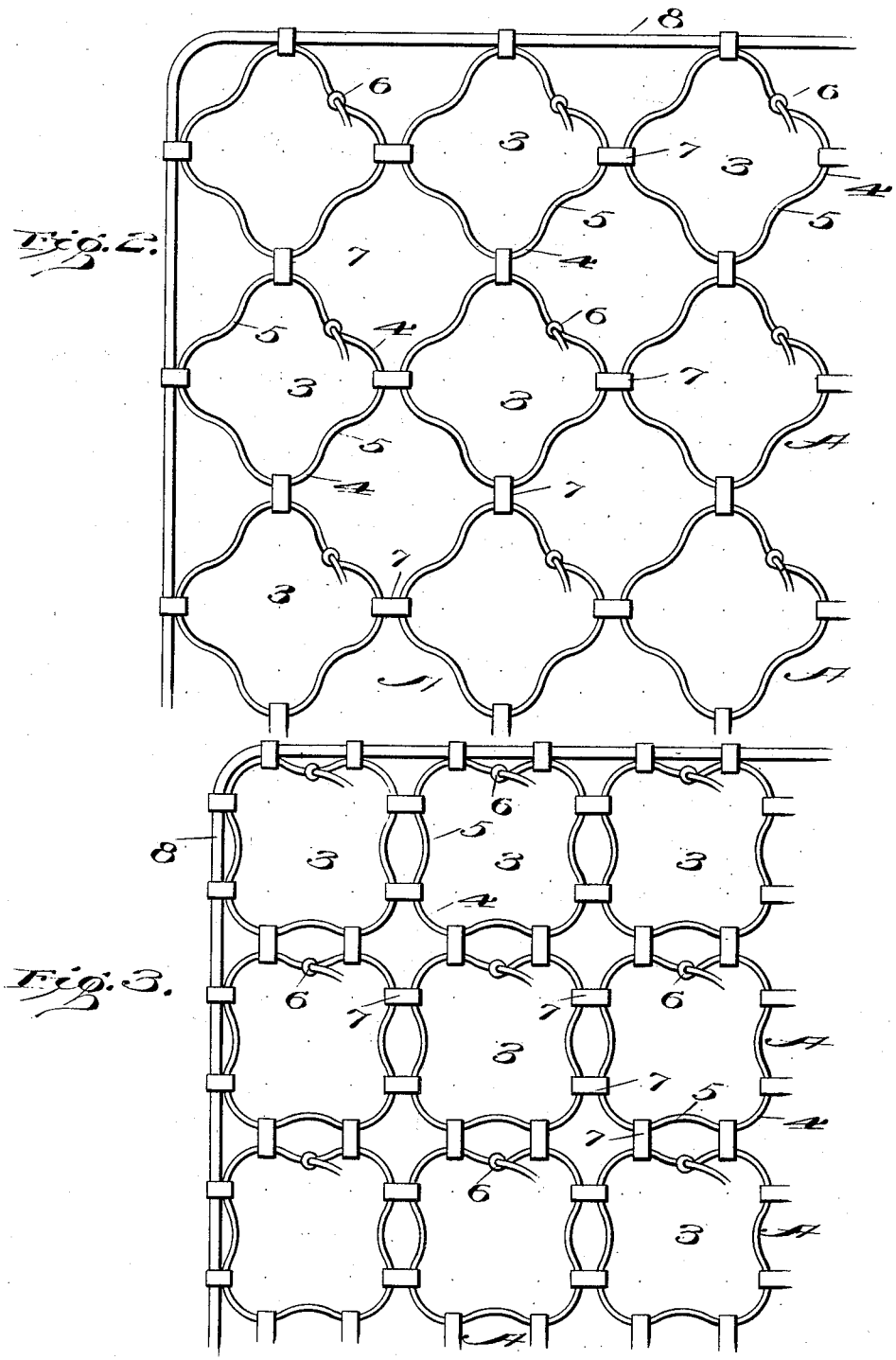

UNITED STATES PATENT OFFICE.

JOHN A. STAPLES, OF NEWBURGH, NEW YORK.

SPRING SYSTEM FOR BEDS, &c.

944,518.　　　　　Specification of Letters Patent.　　Patented Dec. 28, 1909.

Application filed July 25, 1904.　Serial No. 217,999.

*To all whom it may concern:*

Be it known that I, JOHN A. STAPLES, residing at Newburgh, in the county of Orange and State of New York, have invented certain new and useful Improvements in Spring Systems for Beds, &c., of which the following is a full, clear, and exact description, such as will enable others skilled in the art to which it appertains to make and use the same.

This invention relates to spring systems and the construction and relation of the component members thereof.

One of the objects of this invention is to provide a system of the above type especially adapted for beds, couches, etc., which shall be of secure and yet flexible construction and in which the several springs comprised in the same shall be securly connected one to another at their upper ends.

Another object is to provide such a system in which there will be no sharp bends or turns in the springs which tend to weaken the same and are undesirable for other reasons.

Other objects will be in part obvious and in part pointed out hereinafter.

The invention accordingly consists in the features of construction, combinations of elements and arrangement of parts which will be exemplified in the embodiment herein described and the scope of the application of which will be indicated in the following claims.

In the accompanying drawings, which illustrate several of various possible embodiments of my invention, Figure 1 is a perspective view of a portion of my spring system. Fig. 2 is a diagrammatic plan of a slightly different embodiment. Fig. 3 is a similar view of another modification.

Similar reference characters refer to similar parts throughout the several views.

It may here be noted that in spring systems of this general type, although the manner of supporting the component conical springs at their lower ends by the use of sustaining wires and key wires has been entirely satisfactory, former constructions have been defective in the maintaining of the upper portions of the springs in their proper relative positions. It has been found that there is a marked tendency of the clips or other securing means, whereby the several springs have been connected in some former constructions, to slip upon the springs, if they are sufficiently loose to permit easy motion of the same, and thus result in a distorted supporting surface. If it is attempted to remedy this by means of sharp bends in the upper coils of the several springs, it is found that these bends not only materially weaken the spring but are also objectionable in that they tend to abrade the mattress, upholstery or other material supported thereon. The above and other defects are largely eliminated in constructions of the nature of that herein described.

Referring now to Fig. 1, A represents one of a system of spiral springs which are formed and assembled in accordance with the principles of my invention. These springs are supported in a well known manner upon sustaining wires 1 and key wires 2, the lowermost coil of the spring being locked in position by the same. The sustaining and key wires are supported upon a frame B or other rigid supporting member, the ends of these wires being elevated above the main supporting portions as is shown in Fig. 1. The several springs appearing in Fig. 1 are shown in a proper relative position and the form of these springs and relation one with another, together with the means for retaining them in their correct relative position form the subject matter with which this invention is especially concerned.

As the several component springs are substantially identical one only will be described. Spring A is herein shown as of the conical type, though, obviously, other forms of springs, as, for example, an hour-glass spring, could be used if desired with certain alterations in the parts associated therewith. The form of spring shown, however, has been found to be well adapted for arrangement in systems of this type. The lowermost coil of spring A is retained in place by the interlocking of sustaining wire 1 and key wire 2 and the spring is thus normally held in an upright position and prevented from lateral movement in any direction at its lower end. The upper end, however, as will be obvious from the view shown in Fig. 1 is necessarily otherwise supported as the flexibility of the spring would permit the same to move in any direction notwithstanding the fact that the lowermost coil is rigidly held in place. This auxiliary support is furnished in the following manner:—The upper coil 3 of spring A is bent substantially in the form shown, having four outwardly projecting portions 4 extending respectively in directions at right angles one with another and preferably diagonal with respect to the sustaining and key wires. Between these outwardly projecting portions is an inwardly bent portion 5 preferably of substantially the same radius of curvature as the portion 4. The end of the spring is secured to the same at a point which lies within one of the inwardly bent or laterally depressed portions 5, as shown at 6. It will be noted that the several inwardly and outwardly bent portions of this uppermost coil are substantially equal in extent as well as of radius of curvature, that is, they are subtended by substantially equal angles from a point lying in the plane of the uppermost coil and at the center thereof.

The four outwardly projecting portions are preferably secured to the corresponding adjacent parts upon the neighboring springs by means of a metallic clip 7 which may be of the form shown or any other desired form, and the outermost springs are so positioned with reference to a binding rod or wire 8 so as to be adapted to be secured to the same at two points as shown at 9 and 10, one upon each of two consecutive projections thereof. The remaining springs of the system are secured by clips connected to their corners and are thus arranged with their greatest diameters diagonal with respect to the framework. This construction provides a means of securing each spring to the binding wire at two points, and, inasmuch as the stress along the edges is greater than at the interior connections, owing to the fact that the load upon each spring is transmitted to its neighbor and thus the cumulative effect is brought to bear upon the connection with the binding wire, this double connection is of material value. On account of this double connection there is also less tendency for the outer springs to tilt and thus wrench the clips.

Many of the advantages of a spring system constructed in accordance with this invention should be obvious. The peculiar form and relation of the tops of the several springs, as shown in Figs. 1 and 2, are such that the area outlined by each spring is substantially equal to that of the space lying between the same and its neighbors and in this manner the upper surface of the system provides a substantially uniform supporting surface. The radius of curvature of the projecting parts 4 is such that lateral sliding of the clips 7 upon the same is rendered practically impossible in the course of ordinary use and yet these portions are of such an even curvature that the spring is not weakened at this point. The latter is also true of the inwardly extending portions 5 as the radius of curvature is substantially the same, and not only is a strong spring provided but in action there are no sharp bends or corners which are likely to project above the general level of the upper surface of the spring system and tear the members supported thereon or become objectionable in other ways. The clips, although prevented from lateral movement as above described, have a free rotary movement about the spring and thus add to the flexibility of the system and do not cut into the coil at the point at which they are mounted.

Further advantages in the peculiar construction of the upper coil of the spring lie in the fact that, owing to the alternate projections and depressions in this coil with respect to the axis of the spring, any load brought to bear either directly or from a neighboring spring upon an outwardly extending portion 4 is substantially above the lower coils of the spring and is thus transmitted directly down upon the same. In constructions wherein the upper coil is substantially circular with the exception of outward extending projections, any load brought to bear upon these projections is at such a distance from the axis of the spring that considerable leverage is exerted thereon tending to tilt and possibly break or bend the spring. Another advantage is that, owing to the considerable length of wire in the upper coil of the spring the same is peculiarly adapted to support upholstery or any other material which may be secured upon the same.

In Fig. 2 is shown another embodiment of my invention which is in many respects similar to that above described, but differs in that the springs are so arranged as to lie with the greatest diameters of their top coils substantially parallel with the members of the frame B. In this manner a maximum of flexibility of movement of the several springs with respect one to another and to the binding wire 8 results, but this flexibility is attained at a cost of some degree of strength and stability in the connection between the binding wire and the several springs adjacent thereto.

In Fig. 3 is shown still another arrangement in which the springs are connected one with another and with the binding wire at two points upon two adjacent outwardly projecting portions as shown. In this form a maximum of strength and stability is attained, but the uniformity of the supporting surface and extreme flexibility of the system is to some extent sacrificed. The number of connections between the several springs, however, tends to reduce the stress upon each of the same, in an obvious manner, and thus smaller connecting members may be used. Also, the fact that the springs are each supported at a large number of points reduces the tilting and twisting of the same to a minimum. It will also be noted in connection with this construction that any load upon a single spring unit is transmitted through eight connecting members to the neighboring spring units and the stress is thus uniformly distributed.

It will be obvious that the conditions imposed by the character of the use for which a spring system is intended might dictate the choice of one of the forms shown in preference to the others, each having certain advantages, while various other conditions might demand further modifications which would still come within the scope of this invention and be easily deduced from this exposition thereof.

It will thus be seen that I have provided a simple and efficient spring system of marked beauty and attractiveness of appearance in which the component parts are few and inexpensive and are easily assembled by comparatively unskilled labor. The several springs, although of such a meritorious form, are yet easily manufactured by the performance of a single, simple operation upon an ordinary spiral spring having circular coils. The construction herein shown forms a stable and reliable supporting surface and, owing to the peculiar form and relation of the several parts thereof, the wear upon each of the same is reduced to a minimum. It will also be noted that, owing to the fact that the connecting clips are positioned in the outwardly projecting portions of the upper coils, they are somewhat offset with reference to the coils below and thus avoid contact with them in use. In this manner all chance of interference and consequent wear and noise is avoided.

As many changes could be made in the above construction and many apparently widely different embodiments of my invention could be made without departing from the scope thereof, I intend that all matter contained in the above description and shown in the accompanying drawings shall be interpreted as illustrative and not in a limiting sense. I desire it also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:—

1. A plurality of springs, one coil of each of which is bent so as to have four outwardly projecting portions, said portions being separated by inwardly extending projections similar in curvature and extent thereto, means adapted to connect said springs at said outwardly projecting portions, a frame, and sustaining wires dropped below said frame and adapted to support said springs thereon.

2. A plurality of springs, one coil of each of which is so formed as to have alternate portions concave and convex with respect to a point centrally positioned within said coil, said concave and convex portions being of substantially the same radius of curvature, a binding wire extending about said springs and connected to each of the outermost of said springs at two adjacent convex portions.

3. A plurality of springs, one coil of each of which is so formed as to have alternate portions concave and convex with respect to a point centrally positioned within said coil, said concave and convex portions being of substantially the same radius of curvature, a binding wire extending about said springs and connected to each of the outermost of said springs at two adjacent convex portions, said springs being connected one with another at their convex portions.

4. A plurality of springs, one coil of each of which is bent so as to have four outwardly projecting portions, said projecting portions being separated by inwardly extending portions similar in curvature and extent thereto, a binding wire extending about said coils and secured to the outermost of the same at the outwardly projecting portions thereof, and means adapted to connect said springs one with another at their outwardly projecting portions.

5. A plurality of springs, one coil of each of which is bent so as to have a plurality of outwardly projecting portions, said projecting portions being separated by inwardly extending portions similar in extent and curvature thereto, a binding wire extending about said coils, and secured to each of the outermost of the same at two consecutive outwardly projecting portions, a frame, sustaining wires secured to said frame and dropped below the plane of the same and adapted to support said springs thereon.

6. In combination, a plurality of springs, the upper coils of which lie substantially within the same plane and are so shaped and arranged as each to outline an area substantially equal to that of the spaces between said coils, each of said upper coils comprising alternate inwardly and outwardly projecting portions of substantially the same radius of curvature, and a binding wire extending about said coils and secured to each of the coils adjacent thereto at their outwardly projecting portions, said coils being secured one to another at their outwardly projecting portions.

7. In combination, a plurality of springs, the upper coils of which are substantially in the same plane and are provided with alternate inwardly and outwardly extending portions so shaped and arranged with relation one to another that the area outlined by each of said upper coils is substantially that of the area of the spaces between the same, and a binding wire extending about said coils and secured to each of the coils adjacent thereto at two consecutive outwardly projecting portions.

8. In combination, a frame, a plurality of springs, and means for supporting said springs from said frame, the upper coils of each of said springs being so shaped as to have alternate inwardly and outwardly projecting portions substantially equal in extent and being connected one to another at the said outwardly projecting portions.

9. In combination, a frame, a plurality of springs, means for supporting said springs from said frame, and a binding rod, the uppermost coils of each of said springs being shaped so as to have alternate inwardly and outwardly projecting portions substantially equal in curvature and being connected one to another and to said binding wire at said outwardly projecting portions.

10. In combination, in a spring system for beds, &c., a frame, a plurality of springs, means adapted to support said springs from said frame, and a binding rod, the uppermost coils of each of said springs being shaped so as to have alternate inwardly and outwardly projecting portions with reference to the axes thereof and being connected on to another at the central parts of said outwardly projecting portions and positioned with their minor diameters parallel to said binding wire and each coil adjacent thereto being connected to the same at two consecutive outwardly extending portions.

11. In combination, in a spring system for beds, &c., a frame, a plurality of springs, means for supporting said springs from said frame, a connecting means extending about the edges of said spring system, each of said springs having its upper coil formed with inwardly and outwardly extending portions, and connections for said springs extending between adjacent outwardly extending portions thereof.

In testimony whereof I affix my signature, in the presence of two witnesses.

JOHN A. STAPLES.

Witnesses:
ALEX D. DARRAGH,
C. K. HANFORD.